United States Patent
Kerofsky et al.

(10) Patent No.: US 11,902,531 B2
(45) Date of Patent: Feb. 13, 2024

(54) LOW FREQUENCY NON-SEPARABLE TRANSFORM FOR VIDEO CODING

(71) Applicant: QUALCOMM Incorporated, San Diego, CA (US)

(72) Inventors: Louis Joseph Kerofsky, San Diego, CA (US); Muhammed Zeyd Coban, Carlsbad, CA (US); Bappaditya Ray, San Diego, CA (US); Hilmi Enes Egilmez, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/658,385

(22) Filed: Apr. 7, 2022

(65) Prior Publication Data

US 2022/0329819 A1    Oct. 13, 2022

Related U.S. Application Data

(60) Provisional application No. 63/176,804, filed on Apr. 19, 2021, provisional application No. 63/173,879, filed on Apr. 12, 2021.

(51) Int. Cl.
*H04N 19/136* (2014.01)
*H04N 19/176* (2014.01)
(Continued)

(52) U.S. Cl.
CPC ......... *H04N 19/136* (2014.11); *H04N 19/159* (2014.11); *H04N 19/176* (2014.11); *H04N 19/18* (2014.11)

(58) Field of Classification Search
CPC .. H04N 19/136; H04N 19/159; H04N 19/176; H04N 19/18
See application file for complete search history.

(56) References Cited

U.S. PATENT DOCUMENTS

2022/0060751 A1* 2/2022 Nam ............. H04N 19/619
2022/0109890 A1* 4/2022 Li ................. H04N 19/85
(Continued)

OTHER PUBLICATIONS

Bross B., et al., "Versatile Video Coding (Draft 10)", Joint Video Experts Team (JVET) of ITU-T SG 16 WP 3 and ISO/IEC JTC 1/SC 29/WG 11, 131 MPEG Meeting, 19th JVET Meeting, by Teleconference, Jun. 22-Jul. 1, 2020, Online, (Motion Picture Expert Group or ISO/IEC JTC1/SC29/WG11), No. JVET-S2001-vH, XP030293002, 551 Pages, https://dms.mpeg.expert/doc_enq_user/documents/131_Teleconference/wg11/mS4716-JVET-S2001-v17-JVET-S2001-vH.zip.

(Continued)

*Primary Examiner* — Dramos Kalapodas
(74) *Attorney, Agent, or Firm* — Shumaker & Sieffert, P. A.

(57) ABSTRACT

A method of decoding video data includes determining an intra prediction mode from a plurality of intra prediction modes for a current block of the video data, determining a low frequency non-separable transform (LFNST) kernel from a plurality of LFNST kernels for the current block based on the determined intra prediction mode, wherein at least one LFNST kernel of the plurality of LFNST kernels is associated with at least two different intra prediction modes of the plurality of intra prediction modes, applying an inverse of the determined LFNST kernel to coefficient values generated from a transform unit (TU) of the current block to generate intermediate values, applying an inverse primary transform on the intermediate values to generate residual data, and reconstructing the current block based on the residual data.

26 Claims, 7 Drawing Sheets

(51) Int. Cl.
*H04N 19/159* (2014.01)
*H04N 19/18* (2014.01)

(56) References Cited

U.S. PATENT DOCUMENTS

| | | | | |
|---|---|---|---|---|
| 2022/0353504 A1* | 11/2022 | Koo | ............... | H04N 19/60 |
| 2022/0385943 A1* | 12/2022 | Koo | ............... | H04N 19/70 |
| 2022/0385946 A1* | 12/2022 | Chiang | ............... | H04N 19/176 |
| 2022/0394278 A1* | 12/2022 | Koo | ............... | H04N 19/186 |
| 2022/0417518 A1* | 12/2022 | Koo | ............... | H04N 19/18 |

OTHER PUBLICATIONS

Chang Y-J., et al., "Compression Efficiency Methods Beyond VVC", 21st JVET Meeting, JVET of ITU-T SG 16 WP 3 and ISO/IEC JTC1/SC29/WG11, No. JVET-U0100, by teleconference, Jan. 6-15, 2021, Dec. 31, 2020, XP030293237, Jan. 11, 2021-Jan. 15, 2021, Online, 133rd MPEG Meeting, (Motion Picture Expert Group or ISO/IEC JTC1/SC29/WG11), No. m55890, XP030290689, pp. 1-13, https://jvet-experts.org/doc_end_user/documents/21_Teleconference/wg11/JVET-U0100-v1.zip.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.

ITU-T H.265: "Series H: Audiovisual and Multimedia Systems Infrastructure of Audiovisual Services—Coding of Moving Video", High Efficiency Video Coding, the International Telecommunication Union, Jun. 2019, 696 Pages.

Ray B., et al., "Enhanced Intra MTS and LFNST for Compression Beyond VVC", JVET-V0116-v3, Joint Video Experts Team (JVET) of ITU-T SG 16 WP 3 and ISO/IEC JTC 1/SC 29, 22nd Meeting, by teleconference, Apr. 20-28, 2021, pp. 1-10.

Said A., et al., "CE6.1.1: Extended AMT", JVET-K0375-v2, Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-11.

Seregin V., et al., "Exploration Experiment on Enhanced Compression Beyond VVC Capability", JVET-U2024-v1, Joint Video Experts Team (JVET) of ITU-T SG 16 WP 3 and ISO/IEC JTC 1/SC 29, 21st Meeting, by teleconference, Jan. 6-15, 2021, pp. 1-14.

* cited by examiner

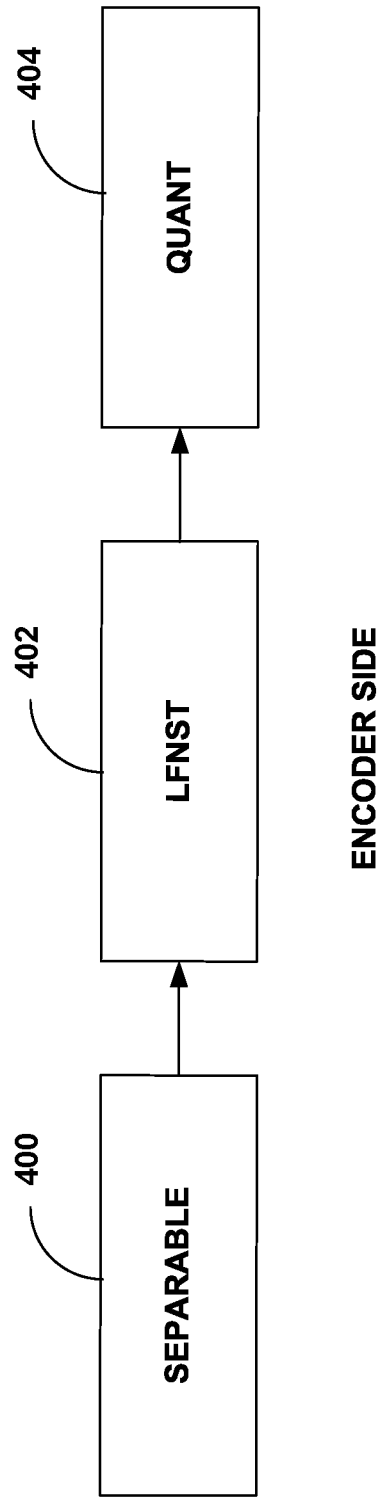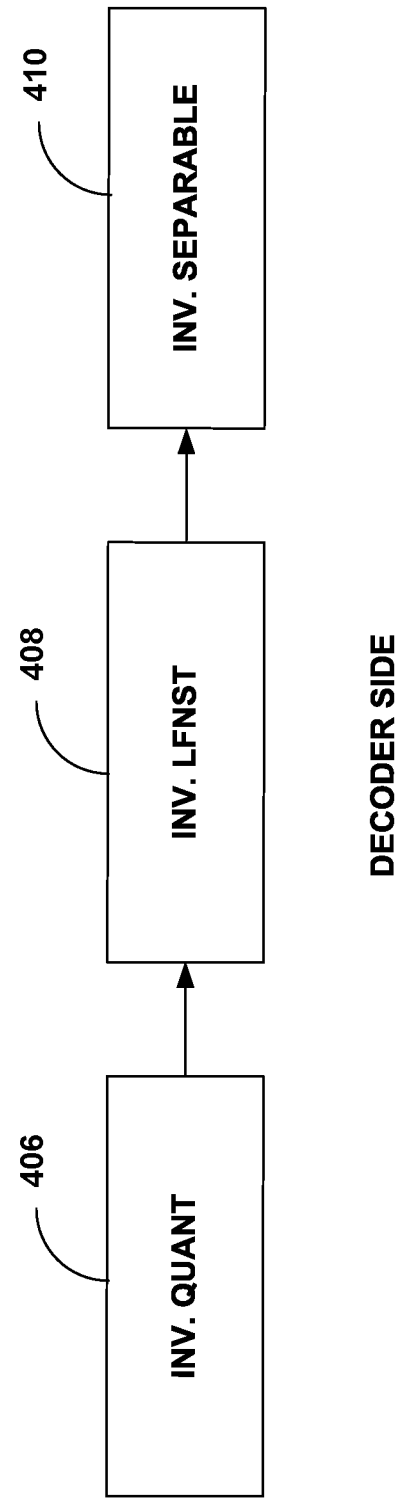
FIG. 4A
FIG. 4B

LOW FREQUENCY NON-SEPARABLE TRANSFORM FOR VIDEO CODING

This application claims benefit of U.S. Provisional Application No. 63/173,879, filed Apr. 12, 2021 and U.S. Provisional Application No. 63/176,804, filed Apr. 19, 2021, the entire content of each is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for applying low frequency non-separable transforms (LFNST) in video coding. For example, as described in more detail, the LFNST kernel that is determined for applying may be based on the size of a transform unit (TU) or an intra prediction mode, as two examples. For instance, rather than having separate LFNST kernel sizes for each TU size or each intra prediction mode, the example techniques describe classes of TUs, where one class of TUs may be assigned to one LFSNT kernel size (e.g., so that the same LFNST kernel size is for two or more TUs in one class). As another example, rather than having separate LFNST kernels for different intra prediction modes, this example techniques describe clusters of intra prediction modes, where at least one LFNST kernel may be applicable to two or more intra prediction modes in a cluster. In this way, the benefits of LFNST may be available for different sized TUs and different intra prediction modes, while minimizing memory overhead of storing different LFNST kernels for each TU size or for each intra prediction mode.

In one example, the disclosure describes a method of decoding video data, the method comprising: determining an intra prediction mode from a plurality of intra prediction modes for a current block of the video data; determining a low frequency non-separable transform (LFNST) kernel from a plurality of LFNST kernels for the current block based on the determined intra prediction mode, wherein at least one LFNST kernel of the plurality of LFNST kernels is associated with at least two different intra prediction modes of the plurality of intra prediction modes; applying an inverse of the determined LFNST kernel to coefficient values generated from a transform unit (TU) of the current block to generate intermediate values; applying an inverse primary transform on the intermediate values to generate residual data; and reconstructing the current block based on the residual data.

In one example, the disclosure describes a device for decoding video data, the device comprising: memory; and processing circuitry coupled to the memory and configured to: determine an intra prediction mode from a plurality of intra prediction modes for a current block of the video data; determine a low frequency non-separable transform (LFNST) kernel from a plurality of LFNST kernels for the current block based on the determined intra prediction mode, wherein at least one LFNST kernel of the plurality of LFNST kernels is associated with at least two different intra prediction modes of the plurality of intra prediction modes; apply an inverse of the determined LFNST kernel to coefficient values generated from a transform unit (TU) of the current block to generate intermediate values; apply an inverse primary transform on the intermediate values to generate residual data; and reconstruct the current block based on the residual data.

In one example, the disclosure describes a method of encoding video data, the method comprising: applying a primary transform on residual data indicative of a difference between a current block of the video data and a prediction block to generate intermediate coefficients; determining an intra prediction mode from a plurality of intra prediction modes for the current block; determining a low frequency non-separable transform (LFNST) kernel from a plurality of LFNST kernels for the current block based on the determined intra prediction mode, wherein at least one LFNST kernel of the plurality of LFNST kernels is associated with at least two different intra prediction modes of the plurality of intra prediction modes; applying the determined LFNST kernel to the intermediate coefficients to generate coefficients of a transform unit (TU) of the current block; and signaling information indicative of the coefficients of the TU.

In one example, the disclosure describes a device for encoding video data, the device comprising: memory; and processing circuitry coupled to the memory and configured to: apply a primary transform on residual data indicative of a difference between a current block of the video data and a prediction block to generate intermediate coefficients; determine an intra prediction mode from a plurality of intra prediction modes for the current block; determine a low frequency non-separable transform (LFNST) kernel from a plurality of LFNST kernels for the current block based on the determined intra prediction mode, wherein at least one LFNST kernel of the plurality of LFNST kernels is associated with at least two different intra prediction modes of the plurality of intra prediction modes; apply the determined LFNST kernel to the intermediate coefficients to generate coefficients of a transform unit (TU) of the current block; and signal information indicative of the coefficients of the TU.

The details of one or more examples are set forth in the accompanying drawings and the description below. Other features, objects, and advantages will be apparent from the description, drawings, and claims.

BRIEF DESCRIPTION OF DRAWINGS

FIGS. 4A and 4B are flow diagrams illustrating examples of coding using a low-frequency non-separable transform (LFNST), in accordance with techniques of this disclosure.

DETAILED DESCRIPTION

Figure 1:
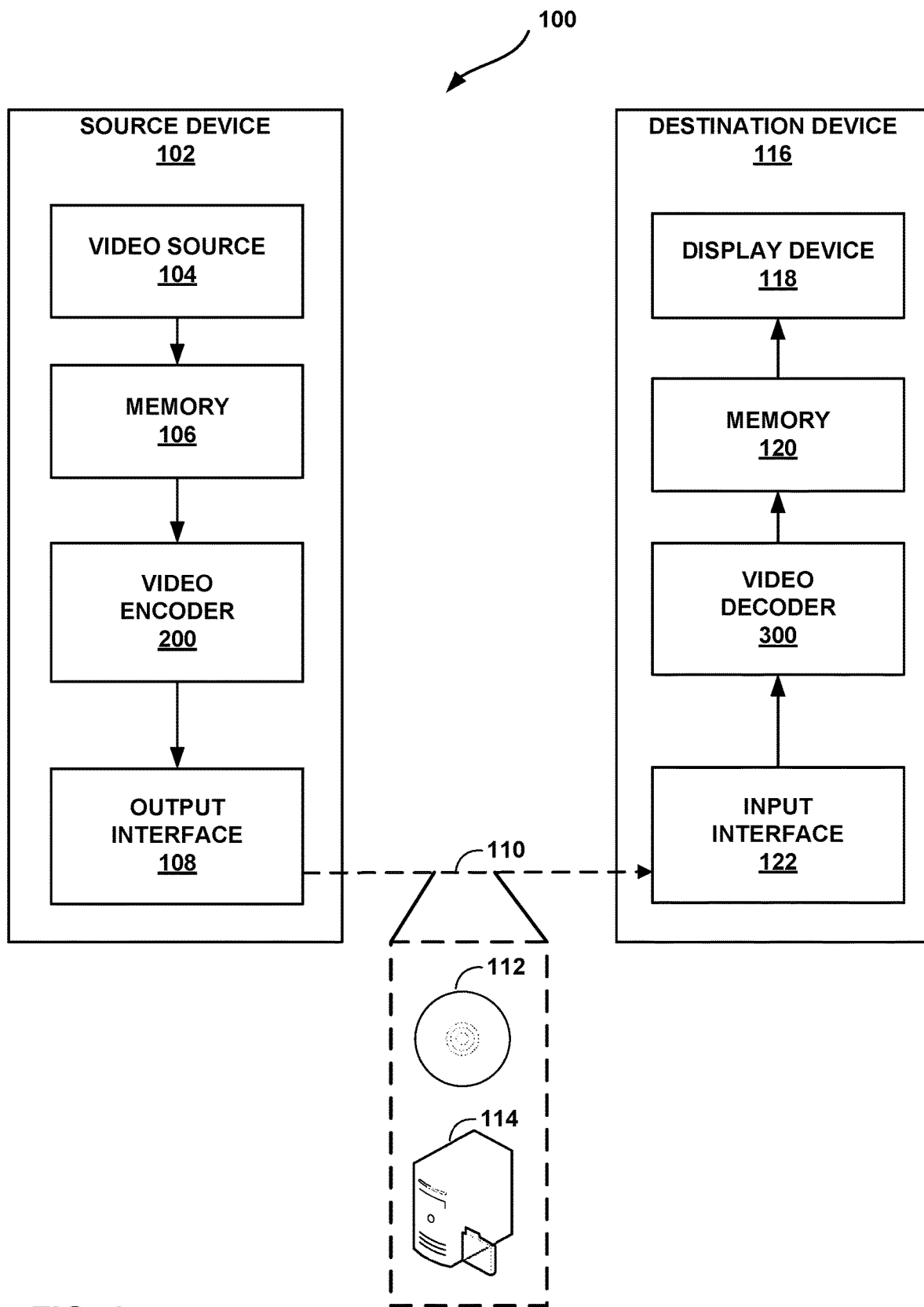
FIG. 1 is a block diagram illustrating an example video encoding and decoding system that may perform the techniques of this disclosure.

In video coding a current block, a video encoder generates a prediction block for the current block and generates residual data based on a difference between the prediction block and the current block. The video encoder applies a primary transform (e.g., discrete cosine transform (DCT)-II or discrete sine transform (DST)-VII, as two examples) on the residual data to generate coefficient values. The video encoder entropy encodes (e.g., possibly after quantizing the coefficient values) coefficient level values for the coefficient values, and signals the resulting entropy encoded coefficient level values.

A video decoder receives the entropy encoded coefficient level values, and performs entropy decoding to generate the coefficient values (possibly quantized coefficient values). The video decoder applies an inverse primary transform (e.g., inverse DCT-II or inverse DST-VII, as two examples) to generate the residual data. The video decoder generates a prediction block in the same manner as the video encoder (e.g., the video encoder signals information that the video decoder uses to determine how to generate the prediction block). The video decoder adds the prediction block to the residual data to reconstruct the current block.

A low frequency non-separable transform (LFNST) is a secondary transform that the video encoder may apply to coefficient values (e.g., after the primary transform). In examples in which LFNST is utilized, the coefficient that the video encoder generates after applying the primary transform may be referred to as intermediate coefficients because applying the LFNST further modifies the intermediate coefficients. For example, the video encoder applies the LFNST to a subset of the coefficient values (e.g., values of a subset of the intermediate coefficient). The result of applying the primary transform may be a transform block. In some examples, the intermediate coefficients may be lower frequency coefficient, and are often located in a rectangular region in the upper left corner of the transform block.

LFNST may be "non-separable," in that an LFNST kernel is a two-dimensional kernel applied to two-dimensional matrix of coefficient values. The primary transform may be separable in that the primary transform is separately applied one-dimensionally (e.g., to row and then column, or vice-versa). In some examples, it may be possible for the primary transform to also be a non-separable transform.

In examples where LFNST is utilized, a video encoder may apply the primary transform to generate intermediate coefficient values, and then apply an LFNST kernel on the coefficient values (e.g., subset of intermediate coefficient values) to generate the coefficient values. The video encoder may entropy encode (e.g., possibly after quantization) the coefficient level values for the coefficient values.

With LFNST, the video decoder may receive the coefficient level values, and entropy decode the coefficient level values to generate coefficient values. The coefficient values may include the intermediate coefficient values (i.e., the coefficient values that were further modified with LFNST by the video encoder). Possibly after inverse quantization, the video decoder may apply an inverse LFNST on the intermediate coefficient values (e.g., the subset of the coefficient values that include the modified coefficient values). An inverse LFNST may be mathematically represented as an inverse matrix of a matrix of the LFNST. For instance, applying the inverse LFNST may be considered as determining the inverse of the LFNST matrix, and applying the inverse of the LFNST matrix to the intermediate coefficient values.

The result may be intermediate values (e.g., intermediate residual data). The term "intermediate residual data" is used to indicate that the result of applying the inverse LFNST is not yet the residual data because an inverse primary transform may still need to be applied. Rather, the result of applying the inverse LFNST is intermediate values (e.g., intermediate residual data) to which an inverse primary transform is applied to generate the residual data. The video decoder may apply inverse primary transform (e.g., inverse DCT-II or inverse DST-VII) to the intermediate values (e.g., intermediate residual data) to generate residual data. The video decoder may then add the residual data to the prediction block to reconstruct the current block.

In some techniques, LFNST may be limited to certain block sizes or for certain intra prediction modes. This disclosure describes example techniques to extend LFNST to different sized blocks and different intra prediction modes.

For instance, different sized transform units (TUs) may be assigned to a class of TUs. In this disclosure, there are TU classes and LFNST kernels. LFNST kernels may be considered as matrices that are applied (e.g., multiplied with) to the intermediate coefficients. The LFNST kernels may be of different sizes, and may be generated based on video content. For each TU class, there may be a plurality of LFNST kernels. Accordingly, in one or more examples, a video decoder may determine the TU class, and then determine the LFNST kernel from the plurality of LFNST kernels for the determined TU class.

There may be a plurality of TU classes, and each class of TU may be for TUs having different sizes. For example, TUs having a first size, second size, and third size may belong to a first class, TUs having a fourth size and a fifth size may belong to a second class, and so forth. Each class of TUs may be assigned with one or more LFNST kernels.

In this way, rather than storing an LFNST kernel for each TU size, the example techniques allow for a reduction in the number of LFNST kernels that need to be stored since the same LFNST kernel is applicable to TUs of different sizes. For example, a first set of LFNST kernels is applicable to a first class of TUs and the first class may be for TUs having a first, second, or third size, and a second set of LFNST kernels is applicable to a second class of TUs and the second class may be for TUs having a fourth and fifth size. Accordingly, rather than having five sets of LFNST kernels (e.g., one for each TU size), there may be two sets of LFNST kernels (e.g., one for each class). Accordingly, the benefits of using LFNST kernels may be realized while minimizing the memory storage overhead.

In some examples, intra prediction modes may be classified into different clusters, each cluster including one or more intra prediction modes. Each cluster of intra prediction modes may be assigned one LFNST kernel. In this way, rather than having an LFNST kernel for each intra prediction mode, the example techniques reduce the number of LFNST kernels that need to be stored since one LFNST kernel is associated with two or more intra prediction modes. For example, at least one LFNST kernel of the plurality of LFNST kernels is associated with at least two different intra prediction modes of the plurality of intra prediction modes. Similar to above, the benefits of LFNST for intra prediction may be realized while minimizing the memory storage overhead.

Accordingly, in general, the example techniques describe ways in which a video encoder and video decoder may determine an LFNST kernel that is to be applied based on a size of a TU or an intra prediction mode. As one example, the video encoder and video decoder may determine a class to which the TU belongs based on a size of the TU, and determine an LFNST kernel to apply based on the determined class. As another example, the video encoder and video decoder may determine a cluster to which an intra prediction mode belongs, and determine an LFNST kernel to apply based on the determine intra prediction mode.

It should be understood that in this disclosure regarding applying the LFNST is used generically as operations performed by both the video encoder and the video decoder. For example, the video decoder may determine an LFNST kernel based on the determined class of TU or determined cluster of intra prediction modes, and apply the inverse of the determined LFNST kernel. Such disclosure also includes the example of the video decoder determining the LFNST kernel by determining an inverse LFNST kernel, and applying the inverse of determined LFNST kernel by applying the determined inverse LFNST kernel. That is, to determine the LFNST kernel, the video decoder may be configured to determine an inverse LFNST kernel, and to apply the inverse of determined LFNST kernel, the video decoder may be configured to apply the determined inverse LFNST kernel.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for low frequency non-separable transform (LFNST) for video coding, such as LFNST per clustered transform unit (TU) size and/or clustered intra prediction mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for LFNST for video coding, such as LFNST per clustered transform unit (TU) size and/or clustered intra prediction mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use LFNST for video coding, such as LFNST per clustered transform unit (TU) size and/or clustered intra prediction mode.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter prediction data, while TUs represent residual data. CUs that are intra-predicted include intra prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter prediction or intra prediction. Inter prediction generally refers to predicting the CU from data of a previously coded picture, whereas intra prediction generally refers to predicting the CU from previously coded data of the same picture. To perform inter prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter prediction mode. In affine motion compensation mode, video encoder 200 may determine two or more motion vectors that represent non-translational motion, such as zoom in or out, rotation, perspective motion, or other irregular motion types.

To perform intra prediction, video encoder 200 may select an intra prediction mode to generate the prediction block. Some examples of VVC provide sixty-seven intra prediction modes, including various directional modes, as well as planar mode and DC mode. In general, video encoder 200 selects an intra prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter prediction modes, video encoder 200 may encode data representing which of the various available inter prediction modes is used, as well as motion information for the corresponding mode. For uni-directional or bi-directional inter prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra prediction or inter prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter prediction) and related prediction information (e.g., motion information for inter prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, LFNST is a method for applying an additional secondary transform to coefficients produced for a transform unit following a primary transform. In some examples, LFNST kernels are used in two methods. For a TU having a minimum size of 4, a single 16×16 kernel is designed for each intra prediction mode. For other TUs, a single 64×64 kernel is designed for each intra prediction mode. For N intra prediction modes, the following matrices are designed:
 a. LFNST4×4[N][16][16]
 b. LFNST8×8 [N][64][64]

A high-level description of encoder and decoder use of LFNST is described as follows. For instance, video encoder 200 may perform the following operations: 1. Calculate primary transform of residual data, 2. Select LFNST kernel, 3. Apply LFNST kernel on subset of primary coefficients to produce modified coefficients, 4. Quantize coefficients, and 5. Entropy code coefficient level. Video decoder 300 may perform the following operations: 1. Entropy decode coefficient levels, 2. Dequantize to produce coefficient values, 3. Select LFNST kernel, 4. Apply inverse LFNST kernel on subset of coefficients (this inverse may be computed as transpose to avoid needing to store additional data using techniques common to matrix calculations), and 5. Calculate inverse primary transform to produce residual data.

This disclosure describes examples for the set of LFNST kernels and how the kernel is indexed and selected. The specific kernel to use for LFNST is indexed by determining if the 4×4 or 8×8 kernel is to be used based on height and width of a TU and the intra prediction mode (ip_mode) is indexed as follows:

a. whge3=width>=8 && height>=8;
    b. Kernel=whge3 ? LFNST8×8[ip_mode] : LFNST4×4[ip_mode]

In the above equation, whge3 indicates whether the 4×4 kernel or 8×8 kernel is to be used. For instance, if both the width and height of a block are greater than or equal to 8, whge3 is true, and indicates that the 8×8 kernel is used. For all other sized blocks, whge3 is false, and indicates that the 4×4 kernel is used.

The selected kernel is then applied to the primary transform coefficients to produce the secondary LFNST coefficients.

There may be certain problems with LFNST techniques. In the current LFNST design, the number of kernels is limited to two classes (4×4 and 8×8) and a different design is used per intra prediction mode. That is, there may be a first TU class for which an LFNST of size 4×4 is used, and a second TU class for which an LFNST of size 8×8 is used.

Increasing the number of kernels can increase compression efficiency at the cost of more memory. Some techniques use the same kernel for all TU sizes 4×M and N×4 and the same kernel for all TU sizes N×M where both N and M are 8 or greater. This limits the ability to adapt to different TU sizes in exchange for a reduced number of kernels, and hence memory. The number of intra prediction modes used for different kernel designs is relatively large, currently 35, which increases the number of kernels needed. This disclosure describes example techniques to increase compression performance with use of LFNST and limiting the number of LFNST kernels, and hence memory.

For example, this disclosure describes examples of having more than two TU classes. For instance, there may be a TU class for which LFNST of size 16×16, 32×32, or 64×64 is used. Also, for each TU class, there may be a plurality of LFNST kernels. For example, there may be a plurality of LFNST kernels of size 4×4, and there may be a plurality of LFNST kernels of size 8×8.

This disclosure describes examples for limiting the number of LFNST kernels used while accounting for TU size and intra prediction mode dependency of the LFNST kernel. For example, this disclosure describes example techniques where video encoder 200 and video decoder 300 are configured to determine to which TU class a TU of the current block belongs, and thereby define the size of the LFNST to use, without needing to define different sized LFNSTs for each TU class. This disclosure also describes example techniques where video encoder 200 and video decoder 300 are configured to determine which LFNST kernel to use based on an intra prediction mode, without needing different LFNST kernels for each intra prediction mode.

The following describes LFNST kernels per TU class. For instance, the TUs may be grouped into classes and LFNST kernels may be designed for each class. That is, for each TU class, there may be a plurality of LFNSTs kernels. Sample classes are shown in the following tables. In an example, a class may be defines as: TuClass=min(K, min(log 2(height)−2, log 2(width)−2)). For example, the value of TuClass may be equal to the minimum between K, the height, and the width. For instance, for relatively large sized blocks, the value of TuClass will be set equal to K. However, for relatively small sized blocks, the value of TuClass will be set based on the smaller of the width or height.

TABLE 1

Min size based TuClass for TU height and width (K = 4, 5 TU classes)

|     | 4 | 8 | 16 | 32 | 64 | 128 | 256 |
|-----|---|---|----|----|----|-----|-----|
| 4   | 0 | 0 | 0  | 0  | 0  | 0   | 0   |
| 8   | 0 | 1 | 1  | 1  | 1  | 1   | 1   |
| 16  | 0 | 1 | 2  | 2  | 2  | 2   | 2   |
| 32  | 0 | 1 | 2  | 3  | 3  | 3   | 3   |
| 64  | 0 | 1 | 2  | 3  | 4  | 4   | 4   |
| 128 | 0 | 1 | 2  | 3  | 4  | 4   | 4   |
| 256 | 0 | 1 | 2  | 3  | 4  | 4   | 4   |

TABLE 2

Min size based TuClass for TU height and width (K = 3, 4 TU classes)

|     | 4 | 8 | 16 | 32 | 64 | 128 | 256 |
|-----|---|---|----|----|----|-----|-----|
| 4   | 0 | 0 | 0  | 0  | 0  | 0   | 0   |
| 8   | 0 | 1 | 1  | 1  | 1  | 1   | 1   |
| 16  | 0 | 1 | 2  | 2  | 2  | 2   | 2   |
| 32  | 0 | 1 | 2  | 3  | 3  | 3   | 3   |
| 64  | 0 | 1 | 2  | 3  | 3  | 3   | 3   |
| 128 | 0 | 1 | 2  | 3  | 3  | 3   | 3   |
| 256 | 0 | 1 | 2  | 3  | 3  | 3   | 3   |

TABLE 3

TuClass per min size and per 4xN Mx4 (K = 3, 9 TU classes)

|     | 4 | 8 | 16 | 32 | 64 | 128 | 256 |
|-----|---|---|----|----|----|-----|-----|
| 4   | 0 | 4 | 5  | 6  | 6  | 6   | 6   |
| 8   | 1 | 7 | 7  | 7  | 7  | 7   | 7   |
| 16  | 2 | 7 | 8  | 8  | 8  | 8   | 8   |
| 32  | 3 | 7 | 8  | 8  | 8  | 8   | 8   |
| 64  | 3 | 7 | 8  | 8  | 8  | 8   | 8   |
| 128 | 3 | 7 | 8  | 8  | 8  | 8   | 8   |
| 256 | 3 | 7 | 8  | 8  | 8  | 8   | 8   |

In Tables 1-3, the height may be represented by the columns. The width may be represented by the rows. However, as the tables are symmetric, the inverse is also possible.

In some examples, the TuClass is computed from the height and width, either by a formula, as above, or a general lookup table (LUT) defining the TuClass indexed by the values of VerIdx and HorIdx, where the values for TuClass may be TuClass=TU_ClassList[VerIdx][HorIdx]. TuClass refers to the value of the class of LFNST kernels (e.g., the value of the class of LFNST kernel within Tables 1-3 above). VerIdx refers to an index into the column of Tables 1-3, and HorIdx refers to an index into the row of Tables 1-3.

The above describes examples of determining a TU class (e.g., a value of TuClass), from a plurality of TU classes, for the current block based on both a height and a width of the TU of the current block. In accordance with one or more examples, the plurality of TU classes includes more than two TU classes. One example way to determine the TU class is by utilizing both the height and the width of the TU as indices into a two-dimensional look-up table (LUT). Tables 1-3 are examples of the two-dimensional LUTs. Another example way to determine the TU class is by utilizing both the height and the width of the TU as inputs into an equation that outputs the TU class. The equation Class=min(K, min (log 2(height)−2, log 2(width)−2) is an example of an equation where both height and width of the TU are inputs, and the output is the TU class.

The TU class may be a numerical value that can be used to determine a size of the LFNST. For instance, in Tables 1-3, the height of the TU or current block defines a row in the respective tables, and the width of the TU or current block defines a column in the respective tables. In this way, the height and width of the TU are indices into a two-dimensional LUT. The output from the LUT may be a value indicating the TU class. That is, as one example, video encoder 200 and video decoder 300 may be configured to determine a TU class, from a plurality of TU classes, for the current block based on both a height and a width of the TU of the current block. A memory for video encoder 200 and a memory for video decoder 300 may store one or more two-dimensional LUTs like Tables 1-3. Video encoder 200 and video decoder 300 may access respective two-dimensional LUTs to determine a TU class.

For instance, in the examples illustrated in Tables 1-3, a TU class is defined by both the height and width of the current block. For example, in Table 1, if the current block is of size 4×4, then the TU class is 0. If the current block is of size 8×256, then the TU class is 1. If the current block is of size 32×16, then the TU class is 2, and so forth. The examples of Tables 2 and 3 illustrate TU classes in a similar way.

As described above, another way in which video encoder 200 and video decoder 300 may determine a TU class, from a plurality of TU classes, for the current block based on both a height and a width of the TU is by utilizing both the height and the width as inputs into an equation that outputs the TU class. For example, video encoder 200 and video decoder 300 may utilize the equation min(K, min(log 2(height)−2, log 2(width)−2), and input height and width of the TU to determine the TU class.

Utilizing both the height and the width of the TU to determine a TU class may allow for having than two TU classes. For instance, in some techniques, there are only two TU classes. For instance, one TU class may be for any TU with a width or height of 4, and the other TU class may be for all other TU sizes. In these other techniques, it may be possible to determine the TU class by determining whether a height or width is 4 to determine the TU class. Determining both the height and width may not be necessary to determine the TU class in these other techniques.

In example techniques described in this disclosure, the plurality of TU classes includes more than two TU classes (e.g., TU classes 0-4 in Table 1, TU classes 0-3 in Table 2, and TU classes 0-8 in Table 3). Accordingly, in such examples, a two-dimensional LUT or equation may be utilized for determining the TU class because there are more than two TU classes. For instance, to determine the TU class, from the plurality of TU classes, where the plurality of TU classes includes more than two TU classes, video encoder 200 and video decoder 300 may determine the TU class based on both a height and a width of the TU (e.g., as indices into a LUT or as inputs into an equation).

From the numerical value of the TU class, video encoder 200 and video decoder 300 may determine the size of the LFNST kernel that is to be used for applying the LFNST. For example, the LFNST kernel size may be selected from the TU class. The LFNST kernel size may alternately be selected from the TU size rather than just class. Selection of LFNST kernel size may be limited to the choices of 4×4, 8×8, 16×16 32×32, or 64×64. In some examples, the LFNST kernel size may be limited to choices of 16×16 or 64×64. For instance, the numerical value of the TU class may map to a LFNST kernel size.

As an example, in the example of Table 3 above, TU class value of 8 may map to a 16×16 LFNST kernel size. TU value of 7 may map to a 8×8 LFNST kernel size. Similarly, in the example of Table 1 above, TU class value of 4 may map to a 64×64 LFNST kernel size, TU class value of 1 may map to a 8×8 LFNST kernel size, and so forth.

There may be a plurality of LFNST kernels for a given LFNST size. Video encoder 200 and video decoder 300 may determine the size of the LFNST kernel from the TU class, and then determine the LFNST kernel from the plurality of LFNST kernels having the determined LFNST size.

For example, video encoder 200 and video decoder 300 may determine a transform unit (TU) class, from a plurality of TU classes, for the current block based on both a height and a width of the TU. The plurality of TU classes includes more than two TU classes. Video encoder 200 and video decoder 300 may determine a plurality of LFNST kernels for the current block based on the determined TU class (e.g., a plurality of LFNST kernels having a size that is determined based on the TU class). Video encoder 200 and video decoder 300 may determine an LFNST kernel from the plurality of LFNST kernels.

In some examples, it may be possible to separate TU shaped based classes for the 4×4 LFNST transforms where instead of basing the transform class on, for example, the minimum of transform width and height for 4×N and N×4 transform units, TU shaped based classes such as 4×N or N×4 classes can be used, where N can be 4, 8, 16, 32, 64, 128, 256, . . . etc. In order to limit the number of classes, N can be capped at maximum transform size where all transform sizes above that would get mapped to the largest TU shape that is supported. One example 4×N, N×4 based transform class for LFNST could be the set: Transform_class[7]={4×4, 4×8, 4×16, 4×32, 8×4, 16×4, 32×4}, where 4×64, 4×128, 4×256 etc are assigned to 4×32 class, and similarly 64×4, 128×4, 256×4, etc. are assigned to 32×4 class. The size of the set can be made smaller or larger based on the largest transform dimension used in classification. In the above example, seven transform shaped based classes would be created for 4×4 LFNST case. A similar approach can applied to the 8×8 case.

The above describes example techniques for determining the TU class, and from there the LFNST kernel size. The following describes example manners in which to determine the LFNST kernel from a plurality of LFNST kernels. The example techniques of determining an LFNST kernel size, as described above, and then determining the LFNST kernel using the techniques described below should not be considered limiting. In some examples, video encoder 200 and video decoder 300 may determine the LFNST kernel size using the techniques described above, and then use different techniques than those described below to determine the LFNST kernel. In some examples, video encoder 200 and video decoder 300 may determine the LFNST size using different techniques than those described above, and then use the techniques described below to determine the LFNST kernel.

In some examples, there may be a corresponding LFNST kernel for each intra prediction mode. For instance, for a TU having size N×M, there may be a plurality of LFNST kernels. The LFNST kernel that video encoder 200 and video decoder 300 may select from the plurality of LFNST kernels may be associated with an intra prediction mode. For instance, if there are ten intra prediction modes, then there would be ten LFNST kernels, one for each of the ten intra prediction modes.

However, as additional intra prediction modes become available, the memory overhead, and the overhead associated with signaling information indicative of the LFNST kernel may increase. In one or more examples, this disclosure describes example ways in which to determine the LFNST kernel based on an intra prediction mode, without requiring there to be a separate LFNST kernel for each of the intra prediction modes.

For instance, this disclosure describes examples of intra prediction mode clustering. For intra prediction mode clustering, rather than having a different kernel for each intra prediction mode, the modes may be clustered and a single LFNST kernel designed for each cluster. In general, intra prediction modes, intraMode, and transform unit height and width values are used to select LFNST kernels. These may be clustered into intermediate values of IpCluster and TuClass which are then used to select the LFNST kernel from the respective TuClass and IpCluster values. Calculation of TuClass is described above (e.g., with respect to Tables 1-3). Calculation of IpCluster value from intraMode is described below.

Some clusters may contain a single element while other clusters contain multiple elements. The clustering of modes may depend upon the TU class or be independent of TU classification. Two examples are show below clustering 35 modes into 18. In the first example, the initial two modes are assigned to individual clusters and the remaining modes are clustered into pairs. The last three may form a single cluster. The second example illustrates taking the first 18 modes as clusters and clustering all remaining modes with the last cluster. These are defined by giving a mapping from 35 inputs to 18 outputs.

One example way of mapping 35 inputs (e.g., 35 intra prediction modes) to 18 outputs (e.g., cluster values) may be based on defining generating a list of size 35 of intra prediction modes. The index into the list may indicate the cluster value, and one or more of the 18 cluster values may be identified in two different locations in the list. Examples of the lists include the two example ClusterintraPred lists below.

ClusterintraPred[35]={0, 1, 2, 2, 3, 3, 4, 4, 5, 5, 6, 6, 7, 7, 8, 8, 9, 9, 10, 10, 11, 11, 12, 12, 13, 13, 14, 14, 15, 15, 16, 16, 17, 17, 17}

ClusterintraPred[35]={0, 1, 2, 3, 4, 5, 6, 7, 8, 9, 10, 11, 12, 13, 14, 15, 16, 17, 17, 17, 17, 17, 17, 17, 17, 17, 17, 17, 17, 17, 17, 17, 17, 17, 17}.

The cluster may be determined based on the intra prediction mode (e.g., intraMode) being an index into the list. The output from accessing the list may be cluster value (e.g., IpCluster). For instance, IpCluster=ClusterintraPred[intraMode].

For instance, in the above examples of ClusterintraPred[ ], there may be a total of 18 LFNST kernels, and the intra prediction mode may be an index into ClusterintraPred[ ]. For instance, there may be 35 intra prediction modes, where each intra prediction mode is indicated by a respective value (e.g., intra prediction mode 0 refers to a first intra prediction mode, intra prediction mode 1 refers to a second intra prediction mode, and so forth). Because there are more intra prediction modes than LFNST kernels, in this example (e.g., 35 intra prediction modes, and 18 LFNST kernels), at least one of the LFNST kernel of the plurality of LFNST kernels is associated with at least two different intra prediction modes of the plurality of intra prediction modes. For instance, two or more of the plurality of intra prediction modes form a cluster, and one of the plurality of LFNST kernels is for that cluster of intra prediction modes.

As an example, a value indicative of the intra prediction mode may be an index into a list of LFNST kernels. The examples of ClusterintraPred[ ] above are two examples of the list of LFNST kernels. Each of the values in ClusterintraPred[ ] corresponds to and identifies a particular LFNST kernel. For instance, referring to the example where ClusterintraPred[35]={0, 1, 2, 2, 3, 3, 4, 4, 5, 5, 6, 6, 7, 7, 8, 8, 9, 9, 10, 10, 11, 11, 12, 12, 13, 13, 14, 14, 15, 15, 16, 16, 17, 17, 17}, intra prediction mode 0 refers to the first entry in ClusterintraPred[ ], and identifies the LFNST kernel associated with the value 0. Intra prediction mode 1 refers to the second entry in ClusterintraPred[ ], and identifies the LFNST kernel associated with the value 1.

In this example, intra prediction mode 2 and intra prediction mode 3 refer to the third and fourth entries in ClusterintraPred, and both identify the same LFNST kernel (e.g., the LFNST kernel associated with the value of 2). Accordingly, in this example, at least one LFNST kernel (e.g., the LFNST kernel associated with the value of 2) of the plurality of LFNST kernels (e.g., the 18 LFNST kernels) is associated with at least two different intra prediction modes (e.g., intra prediction mode 2 and intra prediction mode 3) of the plurality of intra prediction modes (e.g., 35 intra prediction modes). Stated another way, two or more of the plurality of intra prediction modes form a cluster (e.g., intra prediction mode 2 and intra prediction mode 3 form a cluster), and one of the LFNST kernels is for that cluster (e.g., LFNST kernel associated with the value of 2 is for both intra prediction mode 2 and intra prediction mode 3).

As an example, video encoder 200 and video decoder 300 may determine a first intra prediction mode from a plurality of intra prediction modes for a first block, and determine a LFNST kernel from a plurality of LFNST kernels for the first block that is based on the determined first intra prediction mode. For instance, video encoder 200 and video decoder 300 may determine the LFNST kernel with value of 2 based on the first block having an intra prediction mode of 2.

Video encoder 200 and video decoder 300 may determine a second intra prediction mode from a plurality of intra prediction modes for a second block. The second intra prediction mode for the second block is different than the first intra prediction mode for the first block. For instance, the second intra prediction mode for the second block may be intra prediction mode 3, whereas the first intra prediction mode for the first block is intra prediction mode 2. Video encoder 200 and video decoder 300 may determine, based on the second intra prediction mode, the same LFNST kernel for the second block as the LFNST kernel for the first block. For instance, the LFNST kernel is associated with the first intra prediction mode and the second intra prediction mode.

In this example, the LFNST kernel with value of 2 is associated with both intra prediction mode 2 and intra prediction mode 3. For example, the index value of 2 (e.g., corresponding to intra prediction mode 2) for the first example of ClusterintraPred[ ] results in a LFNST kernel value of 2. Also, the index value of 3 (e.g., corresponding to intra prediction mode 3) for the first example of ClusterintraPred[ ] results in the same LFNST kernel value of 2. Therefore, the LFNST kernel with value of 2 is associated with a first intra prediction mode (e.g., intra prediction mode 2) and a second intra prediction mode (e.g., intra prediction mode 3).

Accordingly, at least one LFNST kernel of the plurality of LFNST kernels is associated with at least two different intra prediction modes of the plurality of intra prediction modes. For instance, LFNST kernel 2 is associated with intra prediction mode 2 and intra prediction mode 3. Also, in this example, at least one of the plurality of LFNST kernels is identified in two or more locations in the list of LFNST kernels. For instance, LFNST kernel 2 is identified in the third location and the fourth location in first example of ClusterintraPred[ ]. In one or more examples, because there are fewer LFNST kernels (e.g., 18 LFNST kernels) than intra prediction modes (e.g., 35 intra prediction modes), some of the LFNST kernels are identified more than once in the list of LFNST kernels.

The following describes examples of the operation of selection of the LFNST kernel. The steps may be selection of TuClass, selection of IpCluster, selection of LFNST kernel, determination of kernel size, and application of LFNST kernel.

The TuClass may be computed from the height and width. The IpCluster may be computed from the Intra Mode and TuClass. The LFNST kernel is indexed using the TuClass and the IpCluster for instance via a LUT containing pointers to various transform kernel matrices in g-pLfnstMatrix[ ][ ], trMat=g_pLfnstMatrix[TuClass][IpCluster]. In some examples, The LFNST kernel size may be computed from the TuClass.

Figure 2:
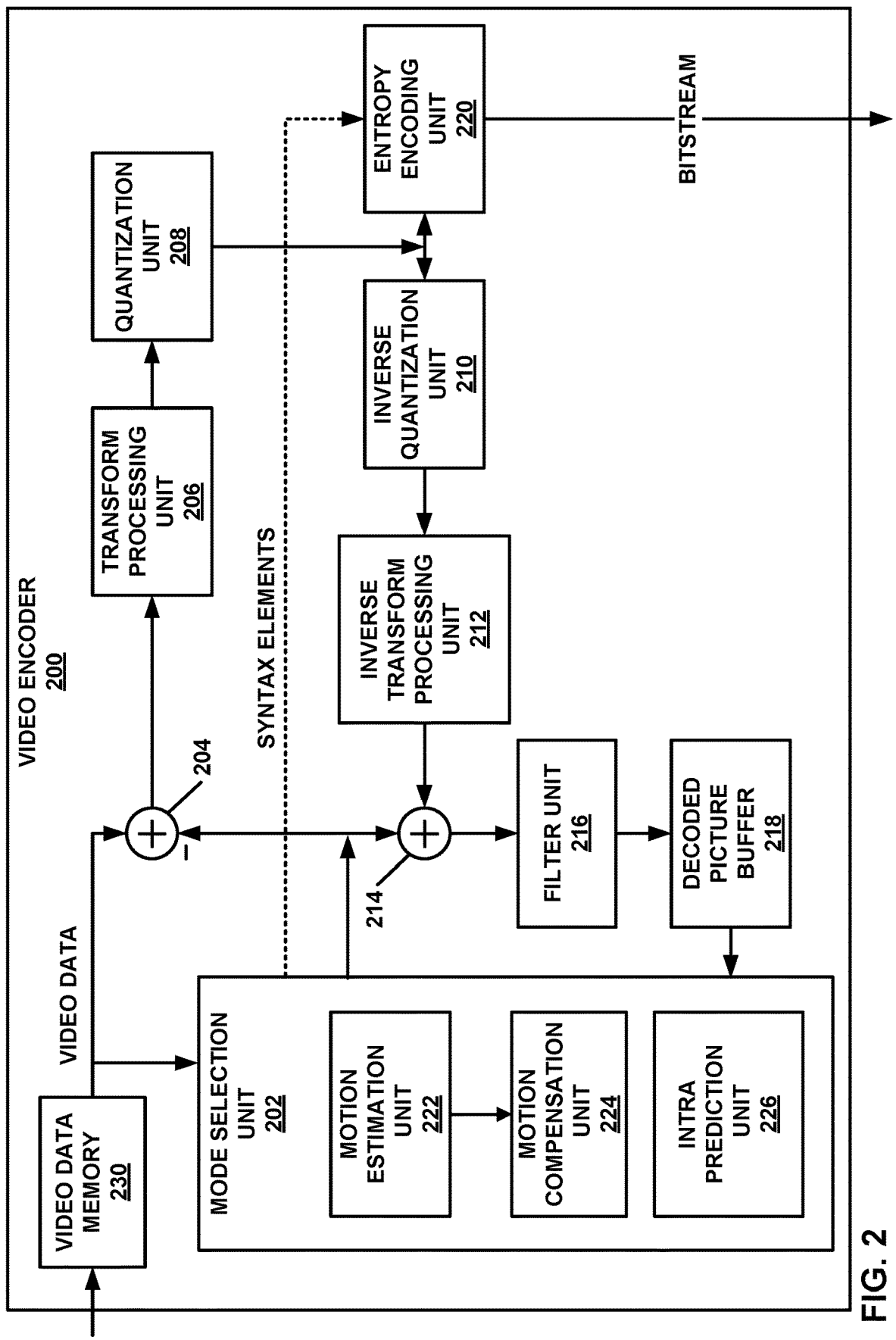
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra prediction unit 226) to generate a prediction block for a current block (e.g., a current CU, or in HEVC, the overlapping portion of a PU and a TU). For inter prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter prediction, motion estimation unit 222 may provide a single motion vector, whereas for bi-directional inter prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra prediction, or intra prediction coding, intra prediction unit 226 may generate the prediction block from samples neighboring the current block. For example, for directional modes, intra prediction unit 226 may generally mathematically combine values of neighboring samples and populate these calculated values in the defined direction across the current block to produce the prediction block. As another example, for DC mode, intra prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter prediction or intra-mode information for intra prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra prediction process may be the same for the luma coding block and the chroma coding blocks.

Video encoder 200 represents an example of a device configured to encode video data including a memory configured to store video data, and one or more processing units implemented in circuitry and configured to determine a class for a transform unit (TU) of a current block of the video data based on a size of the TU, determine a low frequency non-separable transform (LFNST) kernel based on the determined class, apply the determined LFNST kernel to coefficient values generated from the TU to generate modified coefficients, and signaling information indicative of the modified coefficients. Video encoder 200 may be configured to determine a cluster for a transform unit (TU) of a current block of the video data based on an intra prediction mode of the current block, determine a low frequency non-separable transform (LFNST) kernel based on the determined cluster, apply the determined LFNST kernel to coefficient values generated from the TU to generate modified coefficients, and signal information indicative of the modified coefficients.

In one or more examples, transform processing unit 206 may be configured to apply a primary transform (e.g., DCT-2, as one non-limiting example) on residual data indicative of a difference between a current block of the video data and a prediction block to generate intermediate coefficients. The primary transform may be a separable transform.

Transform processing unit 206 may determine an intra prediction mode from a plurality of intra prediction modes for the current block. For instance, mode selection unit 202 may indicate the intra prediction mode to transform processing unit 206. As one example, there may be 35 intra prediction modes, but there may be more or fewer intra prediction modes.

Transform processing unit 206 may determine a low frequency non-separable transform (LFNST) kernel from a plurality of LFNST kernels for the current block based on the determined intra prediction mode. In accordance with examples described in this disclosure, at least one LFNST kernel of the plurality of LFNST kernels is associated with at least two different intra prediction modes of the plurality of intra prediction modes. Transform processing unit 206 may apply the determined LFNST kernel to the intermediate coefficients to generate coefficients of a transform unit (TU) of the current block. Quantization unit 208 may quantize the values of the coefficients, and entropy encoding unit 220 may entropy encode and signal information indicative of the coefficients of the TU.

Figure 3:
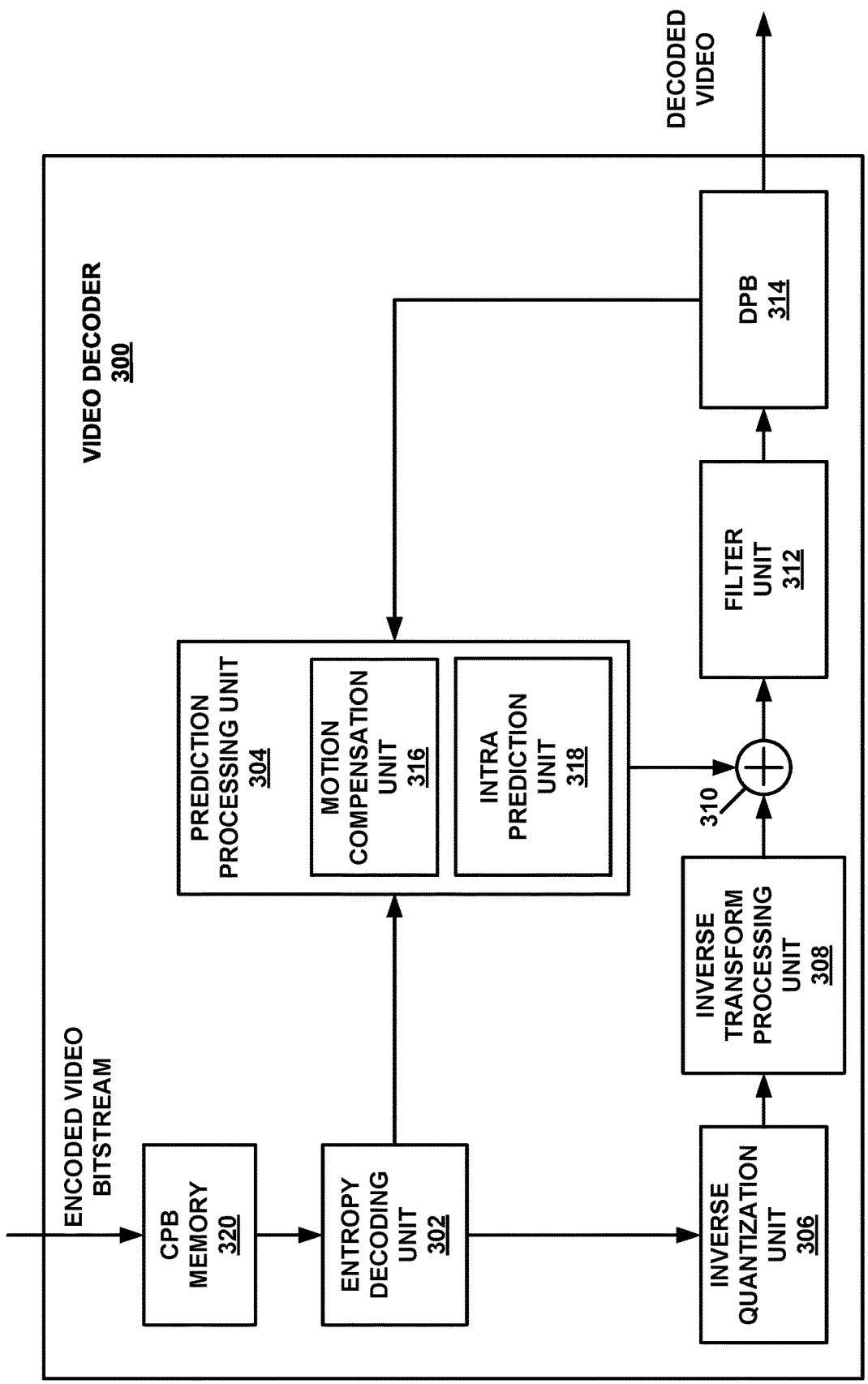
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter prediction process in a manner that is substantially similar to that described with respect to motion compensation unit 224 (FIG. 2).

As another example, if the prediction information syntax elements indicate that the current block is intra-predicted, intra prediction unit 318 may generate the prediction block according to an intra prediction mode indicated by the prediction information syntax elements. Again, intra prediction unit 318 may generally perform the intra prediction process in a manner that is substantially similar to that described with respect to intra prediction unit 226 (FIG. 2). intra prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a class for a transform unit (TU) of a current block of the video data based on a size of the TU, determine a low frequency non-separable transform (LFNST) kernel based on the determined class, apply an inverse of determined LFNST kernel to coefficient values generated from the TU to generate intermediate values (e.g., intermediate residual data), apply inverse primary transform on the intermediate values to generate residual data, and reconstruct the current block based on the residual data.

With respect to video decoder 300, the term "intermediate residual data" is used to indicate that the result is not yet the residual data because an inverse primary transform may still need to be applied. For instance, after video decoder 300 applies an inverse of the determined LFNST kernel (e.g., inverse LFNST kernel), the result may be intermediate values that are not the original, signaled coefficient values, but are so not the residual values. The primary transform may be applied to the intermediate values (e.g., intermediate residual values) to generate the residual data.

Video decoder 300 may also be configured to determine a cluster for a transform unit (TU) of a current block of the video data based on an intra prediction mode of the current block, determine a low frequency non-separable transform (LFNST) kernel based on the determined cluster, apply an inverse of determined LFNST kernel to coefficient values generated from the TU to generate intermediate values (e.g., intermediate residual data), apply inverse primary transform on the intermediate values to generate residual data; and reconstruct the current block based on the residual data.

As one example, prediction processing unit 304 may determine an intra prediction mode from a plurality of intra prediction modes for a current block of the video data. For instance, prediction processing unit 304 may receive information from the bitstream that identifies the intra prediction mode for the current block. In some examples, the information may be a value that maps to a particular intra prediction mode (e.g., intra prediction mode 0 maps to DC intra prediction).

Prediction processing unit 304 may determine a low frequency non-separable transform (LFNST) kernel from a plurality of LFNST kernels for the current block based on the determined intra prediction mode. In one or more examples, at least one LFNST kernel of the plurality of LFNST kernels is associated with at least two different intra prediction modes of the plurality of intra prediction modes. As one example, prediction processing unit 304 may utilize a value indicative of the determined intra prediction mode as an index into a list of LFNST kernels. Memory of video decoder 300 may store the list of LFNST kernels. Examples of the list of LFNST kernels includes ClusterintraPred[ ]. The indicated element of the list of LFNST kernels may be the determined LFNST kernel that is to be applied. That is, prediction processing unit 304 may use the intra prediction mode an index to identify a location in the list of LFNST kernels. Prediction processing unit may determine the LFNST kernel from the identified location. In one or more examples, at least one of the plurality of LFNST kernels is identified in two or more locations in the list of LFNST kernels.

For instance, in the first and second example of ClusterintraPred[ ], there are 18 LFNTs identified with values from 0 to 17. In the first example of ClusterintraPred[ ], the LFNST identified with value 2 is located in two different locations in ClusterintraPred[ ], the LFNST identified with value 3 is located in two different locations in ClusterintraPred[ ], and so forth, with the LFNST identified with value 17 being located in three different locations in ClusterintraPred[ ]. Similarly, in the second example of ClusterintraPred[ ], the LFNST identified with value 17 is located in locations 18 through 35 in ClusterintraPred[ ] indicating all intra prediction mode values 17 through 34 are clustered to the single IpCluster value of 17.

In one or more examples, entropy decoding unit 302 may entropy decode coefficient levels of coefficients of the TU to generate quantized coefficient values. Inverse quantization unit 306 may inverse quantize the quantized coefficient values to generate the coefficient values.

Inverse transform processing unit 308 may apply an inverse of the determined LFNST kernel to coefficient values generated from the TU of the current block to generate intermediate values (e.g., intermediate residual data). For instance, inverse transform processing unit 308 may apply the inverse of the determined LFNST to a subset of the coefficient values generated from the TU. Inverse transform processing unit 308 may apply an inverse primary transform on the intermediate values to generate residual data.

Reconstruction unit 310 may be configured to reconstruct the current block based on the residual data. For example, prediction processing unit 304 may generate a prediction block for the current block. To reconstruct the current block, reconstruction unit 310 may add the prediction block to the residual data.

The above describes video decoder 300 determining the LFNST kernel. However, video decoder 300 determining the LFNST kernel also encompasses examples where video decoder 300 determines an inverse LFNST kernel. Also, the above describes applying the inverse of the determine LFNST kernel, which also encompasses video decoder 300 applying the determined inverse LFNST kernel.

As described above, at least one LFNST kernel of the plurality of LFNST kernels can be associated with at least two different intra prediction modes of the plurality of intra prediction modes. As an example, the current block may be a first block with a first TU, and the intra prediction mode for the current block may be a first intra prediction mode.

In one or more examples, prediction processing unit 304 may determine a second intra prediction mode from the plurality of intra prediction modes for a second block of the video data. In this example, the second intra prediction mode is different than the first intra prediction mode. In accordance with one or more examples described in this disclosure, prediction processing unit 304 may determine, based on the second intra prediction mode, the same LFNST kernel for the second block as the LFNST kernel for the first block. That is, in this example, the LFNST kernel is associated with the first intra prediction mode and the second intra prediction mode. Accordingly, although the first block and the second block have different intra prediction modes, the LFNST kernel for the first block and the second block may be the same.

As described above, the determined LFNST kernel may be a LFNST kernel from a plurality of LFNST kernels. The particular plurality of LFNST kernels may be defined by a TU class of the TU of the current block. For instance, prediction processing unit 304 may determine a transform unit (TU) class, from a plurality of TU classes, for the current block based on both a height and a width of the TU. In one or more examples, the plurality of TU classes includes more than two TU classes.

Prediction processing unit 304 may determining the plurality of LFNST kernels for the current block based on the determined TU class. As one example, prediction processing unit 304 may utilize both the height and the width as indices into a two-dimensional look-up table (LUT). Examples of the LUT include Tables 1-3. As another example, prediction processing unit 304 may utilize both the height and the width as inputs into an equation that outputs the TU class. Example of the equation is Class=min(K, min(log 2(height)−2, log 2(width)−2).

FIGS. 4A and 4B are flow diagrams illustrating examples of coding using a low-frequency non-separable transform (LFNST). For instance, FIG. 4A illustrates encoding using LFNST. In the example of FIG. 4A, transform processing unit 206 may apply a separable transform (400), which may be a primary transform, on residual data indicative of a difference between a current block of the video data and a prediction block to generate intermediate coefficients. An example of the separable transform is a DCT or DST. The result of applying the primary transform is intermediate coefficients.

Transform processing unit 206 may then apply the LFNST on the intermediate coefficients (402). Transform processing unit 206 may be configured to determine the LFNST to apply using the example techniques described in this disclosure. Transform processing unit 206 need not necessarily apply the LFNST on all intermediate coefficients. Rather, transform processing unit 206 may apply the LFNST on a subset of the intermediate coefficients. The result of applying the LFNST to the LFNST coefficients may be the coefficients of the TU of the current block. Quantization unit 208 may then quantize the coefficients of the TU (404). Entropy encoding unit 220 may encode and signal information indicative of the coefficients of the TU.

FIG. 4B illustrates decoding using LFNST. For example, entropy decoding unit 302 may entropy decode coefficient levels of coefficients of the TU to generate quantized coefficient values. Inverse quantization unit 306 may inverse quantize the quantized coefficient values to generate the coefficient values (406).

Prediction processing unit 304 may determine a LFNST kernel that inverse transform processing unit 308 is to apply utilizing the example techniques described in this disclosure. Inverse transform processing unit 308 may apply an inverse of the determined LFNST kernel to coefficient values generated from a transform unit (TU) of the current block to generate intermediate values (408). In one or more examples, applying the inverse of the determined LFNST kernel may refer to applying the inverse of the determined LFNST to a subset of the coefficient values generated from the TU.

Prediction processing unit 304 determining the LFNST kernel includes examples of prediction processing unit 304 determining an inverse LFNST kernel, and inverse transform processing unit 308 applying an inverse of the determined LFNST kernel includes examples of inverse transform processing unit 308 applying a determined inverse LFNST kernel.

Inverse transform processing unit 308 may apply an inverse separable transform, also called inverse primary transform, on the intermediate values to generate residual data (410). Reconstruction unit 310 may then reconstruct the current block based on the residual data.

Figure 5:
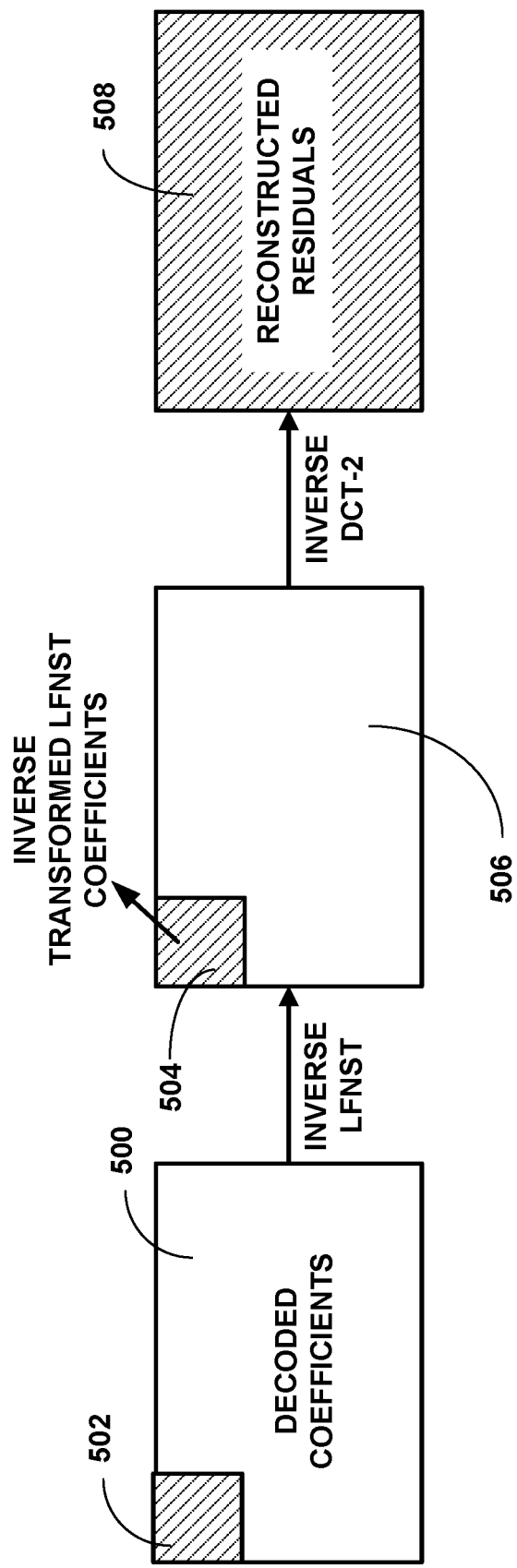
FIG. 5 is a flow diagram illustrating an example of applying an LFNST, in accordance with techniques of this disclosure.

FIG. 5 is a flow diagram illustrating an example of applying an LFNST. For instance, FIG. 5 illustrates an example of inverse transform processing unit 308 applying the inverse of the determined LFNST to a subset of the coefficient values generated from the TU.

In FIG. 5, entropy decoding unit 302 and inverse quantization unit 306 generate decoded coefficients 500. Decoded coefficients 500 may be a TU of the current block. Inverse transform processing unit 308 may receive decoded coefficients 500. In one or more examples, inverse transform processing unit 308 may apply the inverse of the determined LFNST kernel (e.g., determined inverse LFNST kernel) to coefficient values from the TU of the current block to generate intermediate values (e.g., intermediate residual data). However, rather than applying the inverse of the determined LFNST kernel to the entire decoded coefficients 500, inverse transform processing unit 308 may apply the inverse of the determined LFNST kernel to subset 502.

The result of applying the LFNST may be inverse transformed LFNST coefficients 504. The remaining coefficients 506 may be the same as corresponding decoded coefficients 500. In this example, inverse transformed LFNST coefficients 504 form the intermediate values (e.g., intermediate residual data).

Inverse transform processing unit 308 may perform an inverse primary transform on the intermediate values to generate residual data 508. In the example of FIG. 5, the inverse primary transform is a DCT-2.

Figure 6:
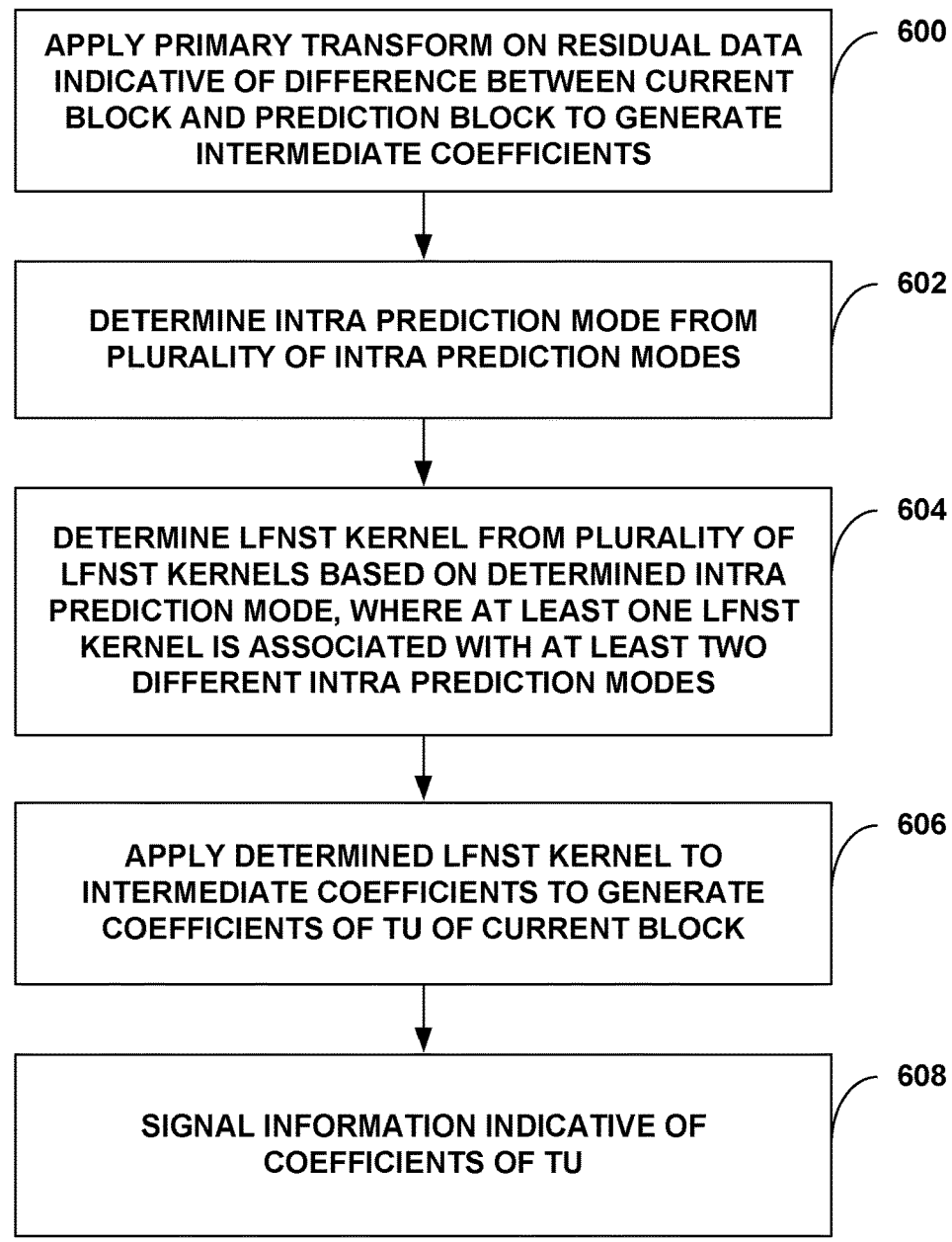
FIG. 6 is a flowchart illustrating an example method for encoding a current block in accordance with the techniques of this disclosure.

FIG. 6 is a flowchart illustrating an example method for encoding a current block in accordance with the techniques of this disclosure. The example techniques are described with respect to processing circuitry. Examples of the processing circuitry include video encoder 200.

The processing circuitry of video encoder 200 may apply a primary transform on residual data indicative of a difference between a current block of the video data and a prediction block to generate intermediate coefficients (600). One example of the primary transform may be the DCT-2 transform.

The processing circuitry of video encoder 200 may determine an intra prediction mode from a plurality of intra prediction modes for the current block (602). For example, mode selection unit 202 may determine the intra prediction mode that provides desired coding results.

The processing circuitry of video encoder 200 may determine a low frequency non-separable transform (LFNST) kernel from a plurality of LFNST kernels for the current block based on the determined intra prediction mode (604). In one or more examples, at least one LFNST kernel of the plurality of LFNST kernels is associated with at least two different intra prediction modes of the plurality of intra prediction modes.

The processing circuitry may apply the determined LFNST kernel to the intermediate coefficients to generate coefficients of a transform unit (TU) of the current block (606). The processing circuitry may signal information indicative of the coefficients of the TU (608). In some examples, the processing circuitry may perform quantization before signaling.

Figure 7:
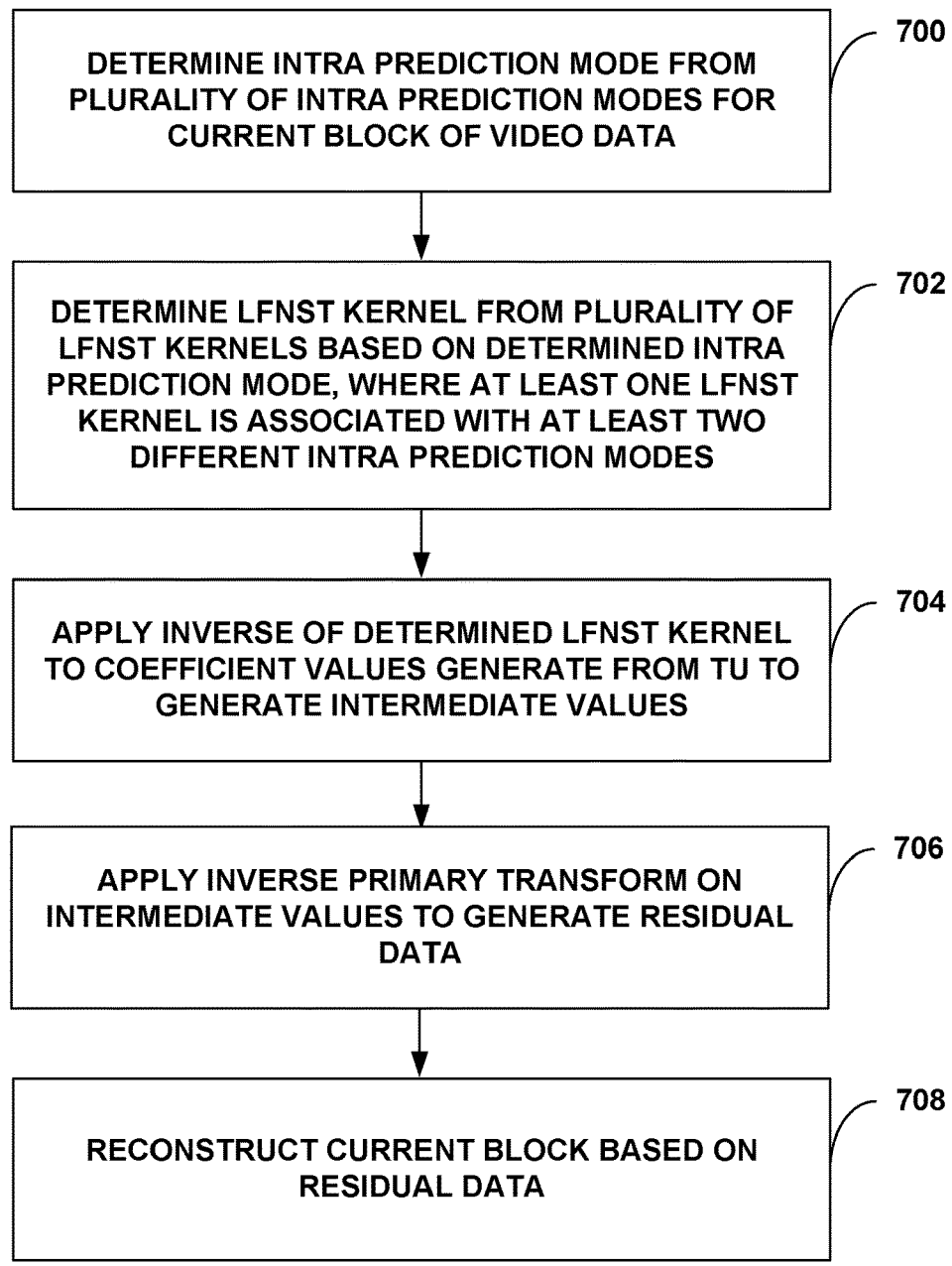
FIG. 7 is a flowchart illustrating an example method for decoding a current block in accordance with the techniques of this disclosure.

FIG. 7 is a flowchart illustrating an example method for decoding a current block in accordance with the techniques of this disclosure. The example techniques are described with respect to processing circuitry. Examples of the processing circuitry include video decoder 300.

The processing circuitry of video decoder 300 may determine an intra prediction mode from a plurality of intra prediction modes for a current block of the video data (700). For example, prediction processing unit 304 may receive information from the bitstream that indicates the intra prediction mode.

The processing circuitry of video decoder 300 may determine a low frequency non-separable transform (LFNST) kernel from a plurality of LFNST kernels for the current block based on the determined intra prediction mode (702). In accordance with one or more examples described in this disclosure, at least one LFNST kernel of the plurality of LFNST kernels is associated with at least two different intra prediction modes of the plurality of intra prediction modes.

For example, to determine the LFNST kernel from the plurality of LFNST kernels for the current block based on the determined intra prediction mode, the processing circuitry may utilize a value indicative of the determined intra prediction mode as an index into a list of LFNST kernels. In some examples, at least one of the plurality of LFNST kernels is identified in two or more locations in the list of LFNST kernels. For instance, the ClusterintraPred[ ] is an example of the list of LFNST kernels. The intra prediction mode is an index into the ClusterintraPred[ ], and the output from ClusterintraPred[ ] is information identifying an LFNST kernel. The information identifying the same LFNST kernel may be two or more locations in the list of LFNST kernels. For instance, the same LFNST kernel is identified in two or locations in the examples of ClusterintraPred[ ].

As an example, the current block is a first block, and the intra prediction mode is a first intra prediction mode. In some examples, the processing circuitry of video decoder 300 may determine a second intra prediction mode from the plurality of intra prediction modes for a second block of the video data. In this example, the second intra prediction mode is different than the first intra prediction mode. The processing circuitry may determine, based on the second intra prediction mode, the same LFNST kernel for the second block as the LFNST kernel for the first block (e.g., based on the second block having the second intra prediction mode). That is, the LFNST kernel is associated with the first intra prediction mode and the second intra prediction mode. For instance, the first intra prediction mode and the second intra prediction mode may be indices into ClusterintraPred[ ]. Although the first intra prediction mode and the second intra prediction mode refer to different locations in ClusterintraPred[ ], these different locations in ClusterintraPred[ ] may identify the same LFNST kernel.

The processing circuitry of video decoder 300 may be configured to apply an inverse of the determined LFNST kernel to coefficient values generated from a transform unit (TU) of the current block to generate intermediate values (e.g., intermediate residual data) (704). As one example, and as illustrated in FIG. 5, the processing circuitry of video decoder 300 may apply the inverse of the determined LFNST to a subset of the coefficient values generated from the TU.

The processing circuitry of video decoder 300 may apply an inverse primary transform on the intermediate values to generate residual data (706). The processing circuitry of video decoder 300 may reconstruct the current block based on the residual data (708).

The following describes one or more examples that may be used together or separately. The techniques described in this disclosure should not be considered limited to the example clauses.

Clause 1. A method of decoding video data, the method comprising determining a class for a transform unit (TU) of a current block of the video data based on a size of the TU, determining a low frequency non-separable transform (LFNST) kernel based on the determined class, applying an inverse of the determined LFNST kernel to coefficient values generated from the TU to generate intermediate residual data, applying inverse primary transform on the intermediate residual data to generate residual data, and reconstructing the current block based on the residual data.

Clause 2. The method of clause 1, further comprising entropy decoding coefficient levels of coefficients of the TU to generate the coefficient values.

Clause 3. The method of any of clauses 1 and 2, further comprising generating a prediction block for the current block, wherein reconstructing the current block comprises adding the prediction block to the residual data.

Clause 4. The method of any of clauses 1-3, wherein determining the LFNST kernel comprises determining the inverse LFNST kernel, and wherein applying the inverse of the determined LFNST kernel comprises applying the determined inverse LFNST kernel.

Clause 5. A method of decoding video data, the method comprising determining a cluster for a transform unit (TU) of a current block of the video data based on an intra prediction mode of the current block, determining a low frequency non-separable transform (LFNST) kernel based on the determined cluster, applying an inverse of the determined LFNST kernel to coefficient values generated from the TU to generate intermediate residual data, applying an inverse primary transform on the intermediate residual data to generate residual data, and reconstructing the current block based on the residual data.

Clause 6. The method of clause 5, further comprising entropy decoding coefficient levels of coefficients of the TU to generate the coefficient values.

Clause 7. The method of any of clauses 5 and 6, further comprising generating a prediction block for the current block, wherein reconstructing the current block comprises adding the prediction block to the residual data.

Clause 8. The method of any of clauses 5-7, wherein determining the LFNST kernel comprises determining the inverse LFNST kernel, and wherein applying the inverse of the determined LFNST kernel comprises applying the determined inverse LFNST kernel.

Clause 9. A method comprising any combination of clauses 1-8.

Clause 10. A method of encoding video data, the method comprising determining a class for a transform unit (TU) of a current block of the video data based on a size of the TU, determining a low frequency non-separable transform (LFNST) kernel based on the determined class, applying the determined LFNST kernel to coefficient values generated from the TU to generate modified coefficients, and signaling information indicative of the modified coefficients.

Clause 11. The method of clause 10, further comprising entropy encoding coefficient level values based on the modified coefficients, wherein signaling information indicative of the modified coefficients comprises signaling the entropy encoded coefficient level values.

Clause 12. The method of any of clauses 10 and 11, further comprising generating a prediction block for the current block, determining residual data based on the prediction block and the current block, and generating the TU based on the residual data.

Clause 13. A method of encoding video data, the method comprising determining a cluster for a transform unit (TU) of a current block of the video data based on an intra prediction mode of the current block, determining a low frequency non-separable transform (LFNST) kernel based on the determined cluster, applying the determined LFNST kernel to coefficient values generated from the TU to generate modified coefficients, and signaling information indicative of the modified coefficients.

Clause 14. The method of clause 13, further comprising entropy encoding coefficient level values based on the modified coefficients, wherein signaling information indicative of the modified coefficients comprises signaling the entropy encoded coefficient level values.

Clause 15. The method of any of clauses 13 and 14, further comprising generating a prediction block for the current block, determining residual data based on the prediction block and the current block, and generating the TU based on the residual data.

Clause 16. A method comprising any combination of clauses 10-15.

Clause 17. A device for decoding video data, the device comprising a memory configured to store video data, and one or more processors configured to perform the method of any one or combination of clauses 1-9.

Clause 18. The device of clause 17, further comprising a display configured to display the video data.

Clause 19. The device of any of clauses 17 and 18, wherein the device comprises one or more of a camera, a computer, a mobile device, a broadcast receiver device, or a set-top box.

Clause 20. A device for encoding video data, the device comprising a memory configured to store video data, and one or more processors configured to perform the method of any one or combination of clauses 10-16.

Clause 21. The device of clause 20, further comprising a camera configured to capture the video data.

Clause 22. The device of any of clauses 20 and 21, wherein the device comprises one or more of a camera, a computer, a mobile device, a broadcast receiver device, or a set-top box.

Clause 23. A computer-readable storage medium having stored thereon instructions that, when executed, cause one or more processors to perform the method of any of clauses 1-9 or 10-16.

Clause 24. A device for decoding video data, the device comprising means for performing the method of any one or combination of clauses 1-9.

Clause 25. A device for encoding video data, the device comprising means for performing the method of any one or combination of clauses 10-16.

Clause 26. A method of decoding video data, the method comprising: determining an intra prediction mode from a plurality of intra prediction modes for a current block of the video data; determining a low frequency non-separable transform (LFNST) kernel from a plurality of LFNST kernels for the current block based on the determined intra prediction mode, wherein at least one LFNST kernel of the plurality of LFNST kernels is associated with at least two different intra prediction modes of the plurality of intra prediction modes; applying an inverse of the determined LFNST kernel to coefficient values generated from a transform unit (TU) of the current block to generate intermediate values; applying an inverse primary transform on the intermediate values to generate residual data; and reconstructing the current block based on the residual data.

Clause 27. The method of clause 26, wherein the current block is a first block and the intra prediction mode is a first intra prediction mode, the method further comprising: determining a second intra prediction mode from the plurality of intra prediction modes for a second block of the video data, wherein the second intra prediction mode is different than the first intra prediction mode; determining, based on the second intra prediction mode, the same LFNST kernel for the second block as the LFNST kernel for the first block, wherein the LFNST kernel is associated with the first intra prediction mode and the second intra prediction mode.

Clause 28. The method of any of clauses 26 and 27, wherein determining the LFNST kernel from the plurality of LFNST kernels for the current block based on the determined intra prediction mode comprises: utilizing a value indicative of the determined intra prediction mode as an index into a list of LFNST kernels, wherein at least one of the plurality of LFNST kernels is identified in two or more locations in the list of LFNST kernels.

Clause 29. The method of any of clauses 26-28, further comprising: determining a transform unit (TU) class, from a plurality of TU classes, for the current block based on both a height and a width of the TU, wherein the plurality of TU classes includes more than two TU classes; and determining the plurality of LFNST kernels for the current block based on the determined TU class.

Clause 30. The method of clause 29, wherein determining the TU class comprises: utilizing both the height and the width as indices into a two-dimensional look-up table (LUT).

Clause 31. The method of clause 29, wherein determining the TU class comprises: utilizing both the height and the width as inputs into an equation that outputs the TU class.

Clause 32. The method of any of clauses 26-31, wherein applying the inverse of the determined LFNST kernel comprises applying the inverse of the determined LFNST to a subset of the coefficient values generated from the TU.

Clause 33. The method of any of clauses 26-32, further comprising: entropy decoding coefficient levels of coefficients of the TU to generate quantized coefficient values; and inverse quantizing the quantized coefficient values to generate the coefficient values.

Clause 34. The method of any of clauses 26-33, further comprising: generating a prediction block for the current block, wherein reconstructing the current block comprises adding the prediction block to the residual data.

Clause 35. The method of any of clauses 26-34, wherein determining the LFNST kernel comprises determining an inverse LFNST kernel, and wherein applying the inverse of the determined LFNST kernel comprises applying the determined inverse LFNST kernel.

Clause 36. A device for decoding video data, the device comprising: memory; and processing circuitry coupled to the memory and configured to: determine an intra prediction mode from a plurality of intra prediction modes for a current block of the video data; determine a low frequency non-separable transform (LFNST) kernel from a plurality of LFNST kernels for the current block based on the determined intra prediction mode, wherein at least one LFNST kernel of the plurality of LFNST kernels is associated with at least two different intra prediction modes of the plurality of intra prediction modes; apply an inverse of the determined LFNST kernel to coefficient values generated from a transform unit (TU) of the current block to generate intermediate values; apply an inverse primary transform on the intermediate values to generate residual data; and reconstruct the current block based on the residual data.

Clause 37. The device of clause 36, wherein the current block is a first block and the intra prediction mode is a first intra prediction mode, and wherein the processing circuitry is configured to: determine a second intra prediction mode from the plurality of intra prediction modes for a second block of the video data, wherein the second intra prediction mode is different than the first intra prediction mode; determine, based on the second intra prediction mode, the same LFNST kernel for the second block as the LFNST kernel for the first block, wherein the LFNST kernel is associated with the first intra prediction mode and the second intra prediction mode.

Clause 38. The device of any of clauses 36 and 37, wherein to determine the LFNST kernel from the plurality of LFNST kernels for the current block based on the determined intra prediction mode, the processing circuitry is configured to: utilize a value indicative of the determined intra prediction mode as an index into a list of LFNST kernels, wherein at least one of the plurality of LFNST kernels is identified in two or more locations in the list of LFNST kernels.

Clause 39. The device of any of clauses 36-38, wherein the processing circuitry is configured to: determine a transform unit (TU) class, from a plurality of TU classes, for the current block based on both a height and a width of the TU wherein the plurality of TU classes includes more than two TU classes; and determine the plurality of LFNST kernels for the current block based on the determined TU class.

Clause 40. The device of clause 39, wherein to determine the TU class, the processing circuitry is configured to: utilize both the height and the width as indices into a two-dimensional look-up table (LUT).

Clause 41. The device of clause 39, wherein to determine the TU class, the processing circuitry is configured to: utilize both the height and the width as inputs into an equation that outputs the TU class.

Clause 42. The device of any of clauses 36-41, wherein to apply the inverse of the determined LFNST kernel, the processing circuitry is configured to apply the inverse of the determined LFNST to a subset of the coefficient values generated from the TU.

Clause 43. The device of any of clauses 36-42, wherein the processing circuitry is configured to: entropy decode coefficient levels of coefficients of the TU to generate quantized coefficient values; and inverse quantize the quantized coefficient values to generate the coefficient values.

Clause 44. The device of any of clauses 36-43, wherein the processing circuitry is configured to: generate a prediction block for the current block, and wherein to reconstruct the current block, the processing circuitry is configured to add the prediction block to the residual data.

Clause 45. The device of any of clauses 36-44, wherein to determine the LFNST kernel, the processing circuitry is configured to determine an inverse LFNST kernel, and wherein to apply the inverse of the determined LFNST kernel, the processing circuitry is configured to apply the determined inverse LFNST kernel.

Clause 46. The device of any of clauses 36-45, further comprising a display configured to display the video data.

Clause 47. The device of any of clauses 36-46, wherein the device comprises one or more of a camera, a computer, a mobile device, a broadcast receiver device, or a set-top box.

Clause 48. A method of encoding video data, the method comprising: applying a primary transform on residual data indicative of a difference between a current block of the video data and a prediction block to generate intermediate coefficients; determining an intra prediction mode from a plurality of intra prediction modes for the current block; determining a low frequency non-separable transform (LFNST) kernel from a plurality of LFNST kernels for the current block based on the determined intra prediction mode, wherein at least one LFNST kernel of the plurality of LFNST kernels is associated with at least two different intra prediction modes of the plurality of intra prediction modes; applying the determined LFNST kernel to the intermediate coefficients to generate coefficients of a transform unit (TU) of the current block; and signaling information indicative of the coefficients of the TU.

Clause 49. The method of clause 48, wherein the current block is a first block and the intra prediction mode is a first intra prediction mode, the method further comprising: determining a second intra prediction mode from the plurality of intra prediction modes for a second block of the video data, wherein the second intra prediction mode is different than the first intra prediction mode; determining, based on the second intra prediction mode, the same LFNST kernel for the second block as the LFNST kernel for the first block, wherein the LFNST kernel is associated with the first intra prediction mode and the second intra prediction mode.

Clause 50. A device for encoding video data, the device comprising: memory; and processing circuitry coupled to the memory and configured to: apply a primary transform on residual data indicative of a difference between a current block of the video data and a prediction block to generate intermediate coefficients; determine an intra prediction mode from a plurality of intra prediction modes for the current block; determine a low frequency non-separable transform (LFNST) kernel from a plurality of LFNST kernels for the current block based on the determined intra prediction mode, wherein at least one LFNST kernel of the plurality of LFNST kernels is associated with at least two different intra prediction modes of the plurality of intra prediction modes; apply the determined LFNST kernel to the intermediate coefficients to generate coefficients of a transform unit (TU) of the current block; and signal information indicative of the coefficients of the TU.

Clause 51. The device of clause 50, wherein the current block is a first block and the intra prediction mode is a first intra prediction mode, and wherein the processing circuitry is configured to: determine a second intra prediction mode from the plurality of intra prediction modes for a second block of the video data, wherein the second intra prediction mode is different than the first intra prediction mode; determine, based on the second intra prediction mode, the same LFNST kernel for the second block as the LFNST kernel for the first block, wherein the LFNST kernel is associated with the first intra prediction mode and the second intra prediction mode.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a transform unit (TU) class from a plurality of TU classes based on a height and a width of a current block of the video data, wherein the plurality of TU classes includes more than two TU classes;
   determining an intra prediction mode from a plurality of intra prediction modes for the current block of the video data;
   determining an intra prediction mode cluster based on the intra prediction mode and the TU class;
   determining a low frequency non-separable transform (LFNST) kernel from a plurality of LFNST kernels for the current block based on the intra prediction mode cluster and the TU class, wherein each LFNST kernel of the plurality of LFNST kernels is assigned to at least one intra prediction mode cluster from a plurality of intra prediction mode clusters and at least one TU class from the plurality of TU classes;
   applying an inverse of the determined LFNST kernel to coefficient values generated from a transform unit (TU) of the current block to generate intermediate values;
   applying an inverse primary transform on the intermediate values to generate residual data; and
   reconstructing the current block based on the residual data.

2. The method of claim 1, wherein the current block is a first block and the intra prediction mode is a first intra prediction mode, the method further comprising:
   determining a second intra prediction mode from the plurality of intra prediction modes for a second block of the video data, wherein the second intra prediction mode is different than the first intra prediction mode; and
   determining, based on the second intra prediction mode, the same LFNST kernel for the second block as the LFNST kernel for the first block, wherein the LFNST kernel is assigned to the first intra prediction mode and the second intra prediction mode.

3. The method of claim 1, wherein determining the LFNST kernel from the plurality of LFNST kernels for the current block comprises:
   utilizing a value indicative of the determined intra prediction mode cluster as an index into a list of LFNST kernels, wherein at least one of the plurality of LFNST kernels is identified in two or more locations in the list of LFNST kernels.

4. The method of claim 1, wherein determining the TU class comprises:
   utilizing both the height and the width as indices into a two-dimensional look-up table (LUT).

5. The method of claim 1, wherein determining the TU class comprises:
   utilizing both the height and the width as inputs into an equation that outputs the TU class.

6. The method of claim 1, wherein applying the inverse of the determined LFNST kernel comprises applying the inverse of the determined LFNST to a subset of the coefficient values generated from the TU.

7. The method of claim 1, further comprising:
   entropy decoding coefficient levels of coefficients of the TU to generate quantized coefficient values; and
   inverse quantizing the quantized coefficient values to generate the coefficient values.

8. The method of claim 1, further comprising:
   generating a prediction block for the current block, wherein reconstructing the current block comprises adding the prediction block to the residual data.

9. The method of claim 1, wherein determining the LFNST kernel comprises determining an inverse LFNST kernel, and wherein applying the inverse of the determined LFNST kernel comprises applying the determined inverse LFNST kernel.

10. A device for decoding video data, the device comprising:
    memory; and
    processing circuitry coupled to the memory and configured to:
       determine a transform unit (TU) class from a plurality of TU classes based on a height and a width of a current block of the video data, wherein the plurality of TU classes includes more than two TU classes;
       determine an intra prediction mode from a plurality of intra prediction modes for the current block of the video data;
       determine an intra prediction mode cluster based on the intra prediction mode and the TU class;
       determine a low frequency non-separable transform (LFNST) kernel from a plurality of LFNST kernels for the current block based on the intra prediction mode cluster and the TU class, wherein each LFNST kernel of the plurality of LFNST kernels is assigned to at least one intra prediction mode cluster from a plurality of intra prediction mode clusters and at least one TU class from the plurality of TU classes;

apply an inverse of the determined LFNST kernel to coefficient values generated from a transform unit (TU) of the current block to generate intermediate values;

apply an inverse primary transform on the intermediate values to generate residual data; and reconstruct the current block based on the residual data.

11. The device of claim 10, wherein the current block is a first block and the intra prediction mode is a first intra prediction mode, and wherein the processing circuitry is configured to:

determine a second intra prediction mode from the plurality of intra prediction modes for a second block of the video data, wherein the second intra prediction mode is different than the first intra prediction mode; and determine, based on the second intra prediction mode, the same LFNST kernel for the second block as the LFNST kernel for the first block, wherein the LFNST kernel is assigned to the first intra prediction mode and the second intra prediction mode.

12. The device of claim 10, wherein to determine the LFNST kernel from the plurality of LFNST kernels for the current block, the processing circuitry is configured to:

utilize a value indicative of the determined intra prediction mode as an index into a list of LFNST kernels, wherein at least one of the plurality of LFNST kernels is identified in two or more locations in the list of LFNST kernels.

13. The device of claim 10, wherein to determine the TU class, the processing circuitry is configured to:

utilize both the height and the width as indices into a two-dimensional look-up table (LUT).

14. The device of claim 10, wherein to determine the TU class, the processing circuitry is configured to:

utilize both the height and the width as inputs into an equation that outputs the TU class.

15. The device of claim 10, wherein to apply the inverse of the determined LFNST kernel, the processing circuitry is configured to apply the inverse of the determined LFNST to a subset of the coefficient values generated from the TU.

16. The device of claim 10, wherein the processing circuitry is configured to:

entropy decode coefficient levels of coefficients of the TU to generate quantized coefficient values; and inverse quantize the quantized coefficient values to generate the coefficient values.

17. The device of claim 10, wherein the processing circuitry is configured to:

generate a prediction block for the current block, and wherein to reconstruct the current block, the processing circuitry is configured to add the prediction block to the residual data.

18. The device of claim 10, wherein to determine the LFNST kernel, the processing circuitry is configured to determine an inverse LFNST kernel, and wherein to apply the inverse of the determined LFNST kernel, the processing circuitry is configured to apply the determined inverse LFNST kernel.

19. The device of claim 10, further comprising a display configured to display the video data.

20. The device of claim 10, wherein the device comprises one or more of a camera, a computer, a mobile device, a broadcast receiver device, or a set-top box.

21. A method of encoding video data, the method comprising:

applying a primary transform on residual data indicative of a difference between a current block of the video data and a prediction block to generate intermediate coefficients;

determining a transform unit (TU) class from a plurality of TU classes based on a height and a width of the current block of the video data, wherein the plurality of TU classes includes more than two TU classes;

determining an intra prediction mode from a plurality of intra prediction modes for the current block;

determining an intra prediction mode cluster based on the intra prediction mode and the TU class;

determining a low frequency non-separable transform (LFNST) kernel from a plurality of LFNST kernels for the current block based on the intra prediction mode cluster and the TU class, wherein each LFNST kernel of the plurality of LFNST kernels is assigned to at least one intra prediction mode cluster from a plurality of intra prediction mode clusters and at least one TU class from the plurality of TU classes;

applying the determined LFNST kernel to the intermediate coefficients to generate coefficients of a transform unit (TU) of the current block; and signaling information indicative of the coefficients of the TU.

22. The method of claim 21, wherein the current block is a first block and the intra prediction mode is a first intra prediction mode, the method further comprising:

determining a second intra prediction mode from the plurality of intra prediction modes for a second block of the video data, wherein the second intra prediction mode is different than the first intra prediction mode; and determining, based on the second intra prediction mode, the same LFNST kernel for the second block as the LFNST kernel for the first block, wherein the LFNST kernel is assigned to the first intra prediction mode and the second intra prediction mode.

23. A device for encoding video data, the device comprising:

memory; and processing circuitry coupled to the memory and configured to:

apply a primary transform on residual data indicative of a difference between a current block of the video data and a prediction block to generate intermediate coefficients;

determine a transform unit (TU) class from a plurality of TU classes based on a height and a width of the current block of the video data, wherein the plurality of TU classes includes more than two TU classes;

determine an intra prediction mode from a plurality of intra prediction modes for the current block;

determine an intra prediction mode cluster based on the intra prediction mode and the TU class;

determine a low frequency non-separable transform (LFNST) kernel from a plurality of LFNST kernels for the current block based on the intra prediction mode cluster and the TU class, wherein each LFNST kernel of the plurality of LFNST kernels is assigned to at least one intra prediction mode cluster from a plurality of intra prediction mode clusters and at least one TU class from the plurality of TU classes;

apply the determined LFNST kernel to the intermediate coefficients to generate coefficients of a transform unit (TU) of the current block; and signal information indicative of the coefficients of the TU.

24. The device of claim 23, wherein the current block is a first block and the intra prediction mode is a first intra prediction mode, and wherein the processing circuitry is configured to:

determine a second intra prediction mode from the plurality of intra prediction modes for a second block of the video data, wherein the second intra prediction mode is different than the first intra prediction mode; and determine, based on the second intra prediction mode, the same LFNST kernel for the second block as the LFNST kernel for the first block, wherein the LFNST kernel is assigned to the first intra prediction mode and the second intra prediction mode.

25. The method of claim 3, wherein the list of LFNST kernels is a two-dimensional look-up table (LUT) and utilizing the value indicative of the determined intra prediction mode cluster as the index into the list of LFNST kernels comprises:

utilizing the value indicative of the determined intra prediction mode as a first index into the two-dimensional LUT and a value of the determined TU class as a second index into the two-dimensional LUT.

26. The apparatus of claim 12, wherein the list of LFNST kernels is a two-dimensional look-up table (LUT) and, to utilize the value indicative of the determined intra prediction mode cluster as the index into the list of LFNST kernels, the processing circuitry is configured to:

utilize the value indicative of the determined intra prediction mode as a first index into the two-dimensional LUT and a value of the determined TU class as a second index into the two-dimensional LUT.

* * * * *